United States Patent
Laumeier et al.

(10) Patent No.: US 10,343,556 B2
(45) Date of Patent: Jul. 9, 2019

(54) SEAT TRACK ASSEMBLY

(71) Applicant: Lear Corporation, Southfield, MI (US)

(72) Inventors: Marc Laumeier, Langenberg-Benteler (DE); Klaus Walter, Panderborn (DE); Michael Wojatzki, Ennigerloh (DE); Peter Stutika, Presov (SK); Frantisek Kotulak, Bardejov (SK)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/591,651

(22) Filed: May 10, 2017

(65) Prior Publication Data

US 2017/0334316 A1   Nov. 23, 2017

(30) Foreign Application Priority Data

May 17, 2016  (DE) .................. 10 2016 208 364

(51) Int. Cl.
| | |
|---|---|
| *B60N 2/07* | (2006.01) |
| *F16C 29/00* | (2006.01) |
| *F16C 29/04* | (2006.01) |
| *F16C 33/38* | (2006.01) |
| *F16C 33/58* | (2006.01) |
| *F16C 33/64* | (2006.01) |
| *F16C 43/04* | (2006.01) |

(52) U.S. Cl.
CPC ......... *B60N 2/0727* (2013.01); *B60N 2/0705* (2013.01); *F16C 29/005* (2013.01); *F16C 29/048* (2013.01); *F16C 33/38* (2013.01); *F16C 33/583* (2013.01); *F16C 33/64* (2013.01); *F16C 43/04* (2013.01); *F16C 2326/08* (2013.01)

(58) Field of Classification Search
CPC ..... B60N 2/0727; B60N 2/0705; F16C 33/38; F16C 29/005; F16C 29/048; F16C 33/583; F16C 33/64; F16C 43/04; F16C 2326/08
USPC ........................................... 296/65.13, 65.14
See application file for complete search history.

(56) References Cited

U.S. PATENT DOCUMENTS

| | | | |
|---|---|---|---|
| 6,364,272 B1 | 4/2002 | Schuler et al. | |
| 7,506,856 B2* | 3/2009 | Ikegaya ............... | B60N 2/0705 248/419 |
| 7,931,246 B2* | 4/2011 | Brewer ................ | B60N 2/0705 248/429 |
| 8,251,335 B2 | 8/2012 | Kojima et al. | |
| 8,282,151 B2 | 10/2012 | Kojima et al. | |
| 8,678,336 B2 | 3/2014 | Couasnon et al. | |
| 8,814,123 B2* | 8/2014 | Suzuki ................ | B60N 2/0705 248/429 |

(Continued)

FOREIGN PATENT DOCUMENTS

| | | |
|---|---|---|
| DE | 19812045 A1 | 9/1999 |
| DE | 202005019749 U1 | 2/2006 |

(Continued)

*Primary Examiner* — Jason S Morrow
*Assistant Examiner* — E Turner Hicks
(74) *Attorney, Agent, or Firm* — Fishman Stewart PLLC

(57) ABSTRACT

A seat track assembly including a first rail configured to move along a second rail. The assembly may include a roller cage disposed at least partially between the first rail and the second rail. In embodiments, the assembly includes a stopper that projects from an inner surface of the second rail and is configured to restrict movement of the roller cage while the movement of the first rail relative to the second rail is independent of the stopper.

19 Claims, 5 Drawing Sheets

(56) References Cited

U.S. PATENT DOCUMENTS

| | | |
|---|---|---|
| 9,016,655 B2 | 4/2015 | Aoi |
| 9,126,505 B2 * | 9/2015 | Moriyama ............... B60N 2/01 |
| 9,126,506 B2 | 9/2015 | Dick |
| 9,758,061 B2 | 9/2017 | Pluta et al. |
| 2010/0090084 A1 * | 4/2010 | Moriyama ........... B60N 2/0725 248/430 |
| 2010/0320353 A1 * | 12/2010 | Kojima ................ B60N 2/0705 248/430 |
| 2012/0168596 A1 | 7/2012 | Ishimoto et al. |
| 2013/0302626 A1 | 11/2013 | Teufel et al. |
| 2014/0239690 A1 * | 8/2014 | Yamada ................... B60N 2/07 297/344.1 |
| 2014/0353454 A1 * | 12/2014 | Yamada ............... B60N 2/0705 248/430 |

FOREIGN PATENT DOCUMENTS

| | | |
|---|---|---|
| DE | 102011115948 B3 | 1/2013 |
| DE | 102013214175 A1 | 11/2014 |

* cited by examiner

SEAT TRACK ASSEMBLY

CROSS-REFERENCE TO RELATED APPLICATION

This application claims the benefit of German Patent Application No. 102016208364.3 filed May 17, 2016, the disclosure of which is hereby incorporated herein by reference in its entirety.

TECHNICAL FIELD

The present disclosure relates to seat track assemblies, including vehicle seat assemblies having a first rail configured to slide and/or move along a second rail.

BACKGROUND

Passenger vehicles, such as automobiles for example, may include one or more vehicle seats that may be configured to support occupants within the vehicle. The one or more vehicle seats may be secured to and/or otherwise supported on a floor located within a passenger compartment of the vehicle. For example, and without limitation, the seat may be supported by one or more seat track assemblies configured for movement in the fore and aft directions (e.g., forward and backward) along the floor of the vehicle.

The seat track assemblies may be configured to be selectively adjusted between various positions along a lower rail. For example, and without limitation, a passenger within the vehicle may actuate a lever and/or an electrical switch to move a seat track assembly forward and/or backward relative to a lower rail. Some seat track assemblies include a component that allows a first rail of the seat track assembly to slide and/or move along a second rail of the seat track assembly. For example, and without limitation, the component may include a cage and roller system. In embodiments, a system for preventing damage to rollers associated with a cage and roller system and for allowing rails of a seat track assembly to slide and/or move independently of a restricted movement of the cage and roller system may be desirable.

SUMMARY

In embodiments of the present disclosure, a seat track assembly may include a first rail configured to move along a second rail. The seat track assembly may also include a roller cage disposed at least partially between the first and second rail. The seat track assembly may also include a stopper projecting from an inner surface of the second rail and configured to restrict movement of the roller cage, where movement of the first rail relative to the second rail is independent of the stopper.

In other embodiments of the present disclosure, a method for manufacturing a seat track assembly may include providing a first rail and a second rail; providing a roller cage at least partially between the first rail and the second rail; providing a stopper; restricting movement of the roller cage via a stopper; and sliding the first rail relative to the second rail independently of the stopper.

DETAILED DESCRIPTION

Reference will now be made to embodiments of the present disclosure, examples of which are described herein and illustrated in the accompanying drawings. While the present disclosure will be described in conjunction with embodiments, it should be understood that they are not intended to limit the present disclosure to these embodiments. On the contrary, the present disclosure is intended to cover alternatives, modifications and equivalents, which may be included within the spirit and scope of the disclosure as defined by the appended claims. Relative terms such as "lower," "upper," "upwardly," "downwardly," "vertical," "horizontal," and "lateral" are used throughout this disclosure to provide convenient reference and are not intended to limit the scope or orientation of the components which they describe.

Seat track assemblies may be configured to be selectively adjusted between various positions along a lower rail. For example, and without limitation, a passenger within a vehicle may actuate a lever and/or an electrical switch to move a seat track assembly, and accordingly, the seat, forward and/or backward relative to a lower rail. Typically, seat track assemblies include a component that allows a first rail of the seat track assembly to slide and/or move along a second rail of the seat track assembly. For example, and without limitation, the component may include a cage and roller system. A device and/or mechanism may be attached, connected to, and/or integral with the second rail in order to prevent rollers associated with the cage and roller system from coming free from the seat track assembly. For example, and without limitation, a roller stop may be provided on a portion of the second rail. A roller stop may engage and/or make contact with a portion the cage and roller system in order to restrict movement of the cage and roller system.

Some systems for restricting movement of a cage and roller system may damage or wear rollers that come in contact with conventional roller stops. Additionally, some systems for restricting movement of a cage and roller system may also restrict movement of the first rail relative to the second rail. Accordingly, a system for reducing or preventing damage to rollers associated with a cage and roller system, and for allowing rails of a seat track assembly to slide and/or move independently of a restricted movement of the cage and roller system, may be desirable.

Figure 1:
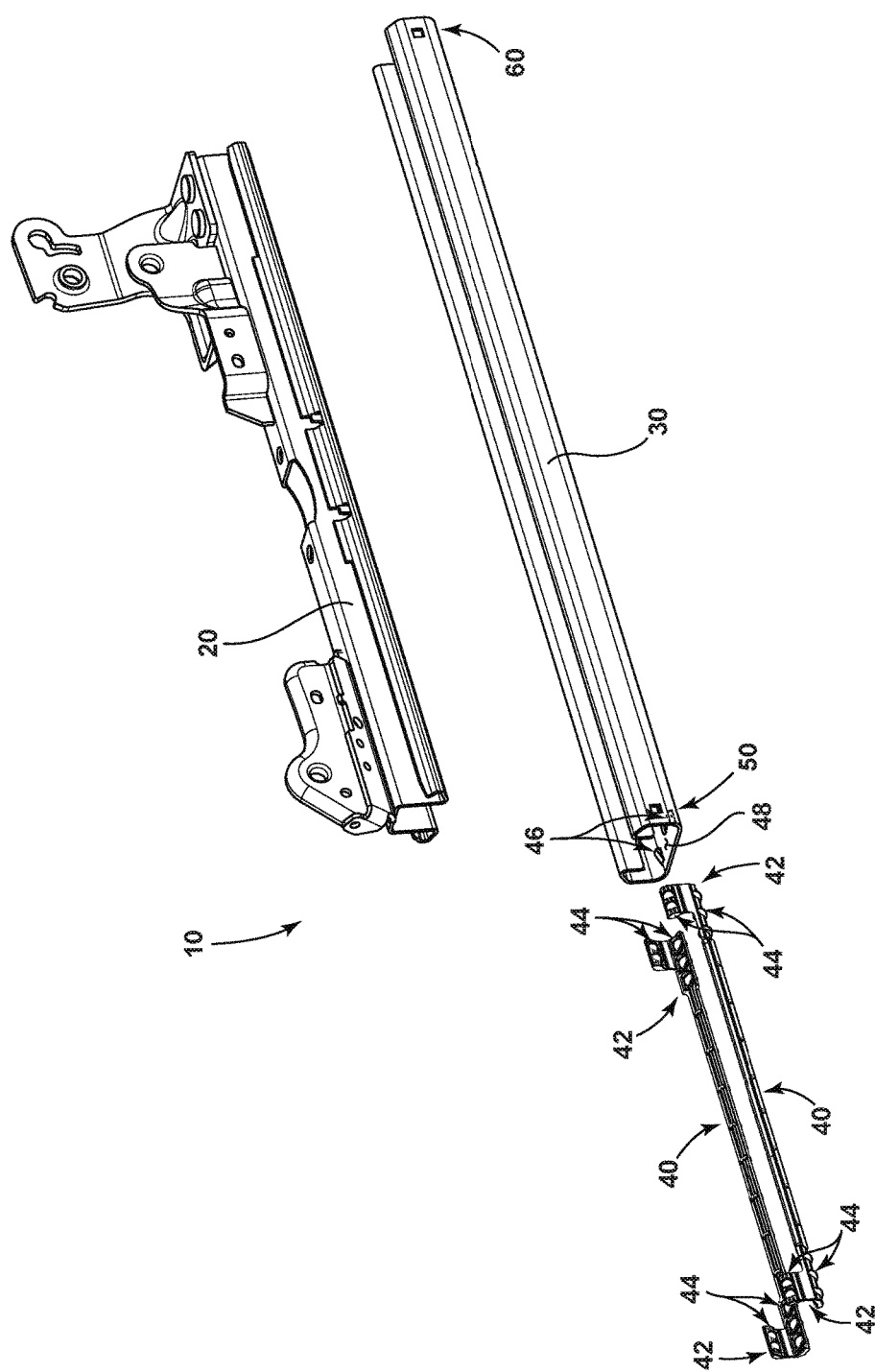
FIG. 1 generally illustrates an exploded view of a seat track assembly according to embodiments of the present disclosure.

Referring now to FIG. 1, a seat track system or assembly 10 is generally illustrated. In an embodiment, an assembly 10 may be configured to support a seat associated with a vehicle, such as an automobile or other type of passenger vehicle. While only an assembly 10 will be described herein, it should be understood that multiple seat track assemblies may be deployed and/or utilized in applications, such as to support a seat within a vehicle. For example, and without limitation, two seat track assemblies may be utilized to support a vehicle seat.

In embodiments, the assembly 10 may include a first or upper rail 20. The upper rail 20 may be configured to support a lower or bottom portion of a vehicle seat. The assembly 10 may include a second or lower rail 30. The lower rail 30 may be configured to be secured to and/or otherwise connected to a surface, such as floor within a passenger compartment of the vehicle.

In embodiments, the upper rail 20 may be configured to slide, move, and/or translate in a substantially horizontal direction along the lower rail 30. For example, and without limitation, the lower rail 30 may be configured to receive at least a portion of the upper rail 20. For example, and without limitation, the lower rail 30 may include a curved and/or bent portion that may be curved and/or bent downward away from the upper rail 20. The upper rail 20 may include a curved and/or bent portion that is curved and/or bent upward away from the lower rail 30. The curved and/or bent portion of the upper rail 20 may be configured to engage and/or connect with the curved and/or bent portion of the lower rail 30. In this manner, the upper rail 20 may be retained and/or held within at least a portion of the lower rail 30, such that, vertical movement relative to the lower rail 30 may be restricted and/or limited by the lower rail 30. Conversely, the curved and/or bent portion of the upper rail 20 being engaged and/or interlocked with the curved and/or bent portion of the lower rail 30 may allow the upper rail 20 to slide, move, and/or translate freely in a substantially horizontal direction along the lower rail 30.

In embodiments, the assembly 10 may include one or more cages 40, which may include roller cages and may be referred to herein as roller cages 40. The one or more roller cages 40 may be at least partially disposed between the upper rail 20 and the lower rail 30. The one or more roller cages 40 may be configured to allow and/or facilitate sliding, moving, and/or translating of the upper rail 20 along and/or relative to the lower rail 30. For example, and without limitation, the one or more roller cages 40 may be configured to reduce and/or limit friction between the upper rail 20 and the lower rail 30. Additionally or alternatively, the one or more roller cages 40 may be configured to guide and/or support the upper rail 20 as it slides, moves, and/or translates along the lower rail 30.

In embodiments, a roller cage 40 may include one or more roller housings 42. The roller housings 42 may be configured to house and/or retain one or more rollers 44. The one or more rollers 44 may comprise ball bearings comprised of a suitable material, such as, for example only, nylon, plastic, metal, or other suitable material.

In embodiments, such as generally illustrated in FIGS. 1, 2A, 2B, and 2C, a lower rail 30 may include one or more stoppers 46. In embodiments, the one or more stoppers 46 may be integrally formed with the lower rail 30; attached and/or connected to the lower rail 30; and/or may comprise a reconfigured portion of the lower rail 30 that is curved, bent, punched, stamped, or otherwise formed from a portion of the lower rail 30. The one or more stoppers 46 may be disposed on an inner surface 48 of the lower rail 30. In embodiments, a pair of stoppers 46 may be disposed at or near a first end 50 of the lower rail 30. In embodiments, a pair of stoppers 46 may be disposed at or near a second end 60 of the lower rail 30. In embodiments, a first pair of stoppers 46 may be disposed at or near the first end 50 and a second pair of stoppers 46 may be disposed at or near the second end 60. It should be understood that while only one lower rail 30 is illustrated, the present disclosure contemplates embodiments including two, three, four, or any suitable number of lower rails.

In embodiments, a stopper 46 may be configured to engage and/or make contact with at least a portion of a roller cage 40. For example, and without limitation, a roller cage 40 may slide, move, and/or translate with and/or relative to the upper rail 20 and/or the lower rail 30. The roller cage 40 may move toward a first end 50 of the lower rail 30. As the roller cage 40 approaches the first end 50, a portion of a stopper 46 may engage and/or make contact with at least a portion of the roller cage 40. The stopper 46 may restrict and/or limit movement of the roller cage 40. For example, and without limitation, the stopper 46 may prevent the roller cage 40 from traveling further beyond the stopper 46. It should be understood that a portion of the roller cage 40 may hang over at least a portion of a cage housing 42. Accordingly, the portion of the roller cage 40 that may hang over a portion of the cage housing 42 may extend beyond a corresponding stopper 46 when the stopper 46 engages the roller cage 40. In embodiments, the upper rail 20 may slide, move, and/or translate along and/or relative to the lower rail 30 independently of a stopper 46 restricting movement of a roller cage 40. That is, the upper rail 20 may retain a full range of movement and/or translation relative to the lower rail 30 irrespective of the movement and/or restricted and/or limited movement of an associated roller cage 40. In embodiments, the lower rail 30 may include an upper rail stop 78, such as is generally illustrated in FIG. 3C. The upper rail stop 78 may be configured to restrict and/or limit movement of the upper rail 20 relative to the lower rail 30.

In embodiments, the stopper 46 may restrict and/or limit movement of one or more rollers 44 associated with the roller cage 40. For example, and without limitation, by engaging and/or making contact with at least a portion of the roller cage 40, the stopper 46 may prevent the one or more rollers 44 from detaching from and/or exiting the roller cage 40. In embodiments, the stopper 46 may prevent and/or limit damage and/or deformation of one or more rollers 44 associated with the roller cage 40. For example, and without limitation, the stopper 46 may be configured to contact the roller cage 40 without contacting the rollers 44 associated with roller cage 40.

Figure 2A:
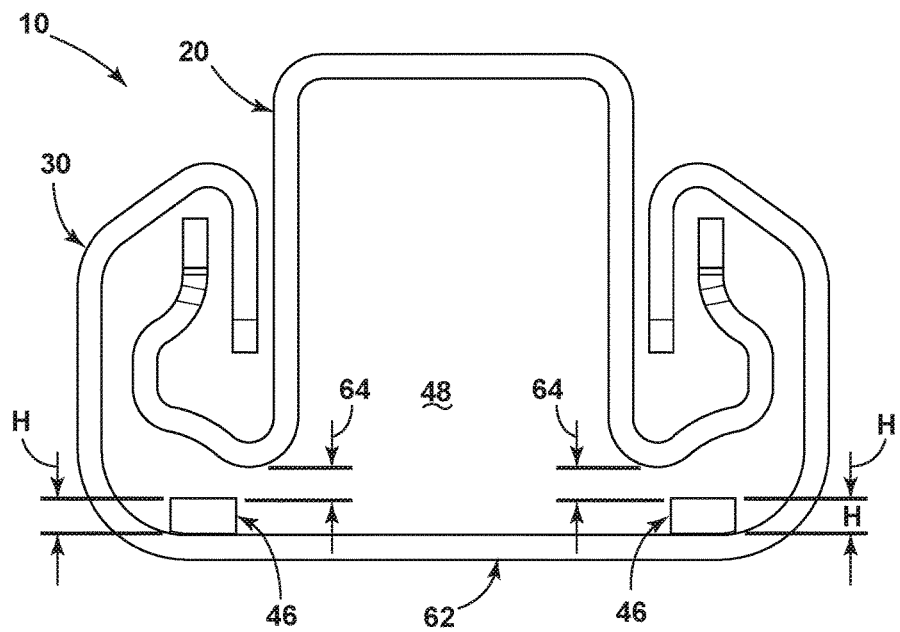
FIG. 2A generally illustrates a front view of a seat track assembly including a plurality of stoppers according to embodiments of the present disclosure.
Figure 2B:
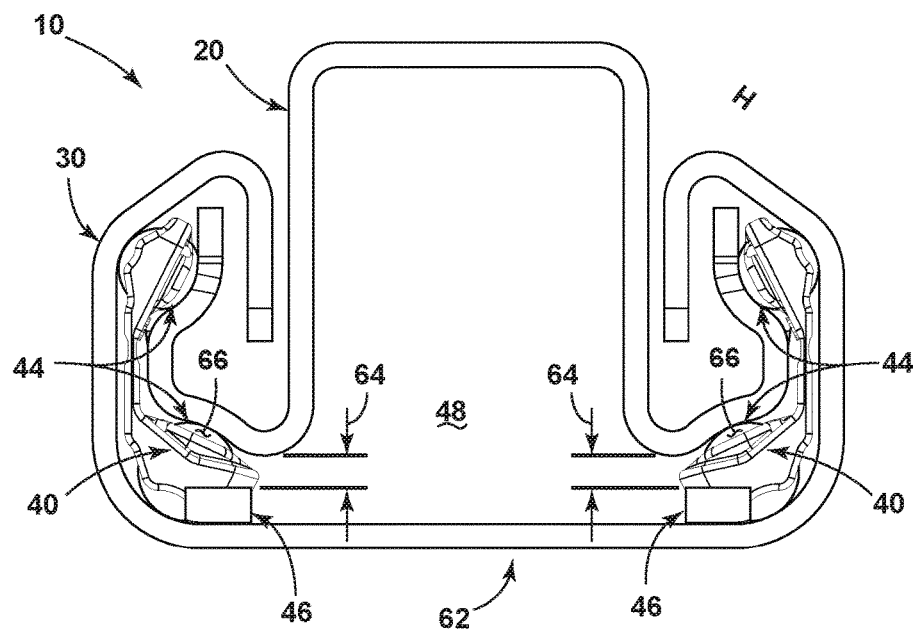
FIG. 2B generally illustrates a front view of the seat track assembly, as generally illustrated in FIG. 2A, including a roller cage according to embodiments of the present disclosure.
Figure 2C:
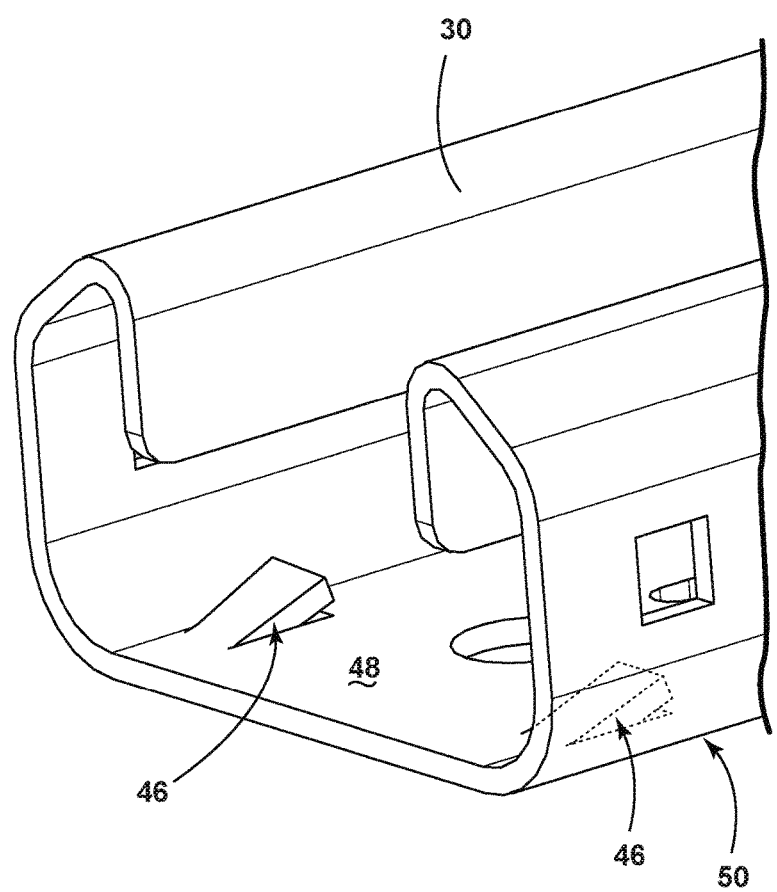
FIG. 2C generally illustrates a perspective view of a seat track assembly according to embodiments of the present disclosure.

With reference to FIG. 2A, a front view of a seat track assembly 10, including an upper rail 20 and a lower rail 30, is generally illustrated. In embodiments, and as described, the lower rail 30 may include one or more stoppers 46 at or near an end of the lower rail 30. The one or more stoppers 46 may be disposed at a bottom portion 62 of the lower rail 30. The one or more stoppers 46 may, for example, comprise a generally rectangular shape and may project upward toward the upper rail 20. In embodiments, a gap 64 may be formed between the one or more stoppers 46 and the upper rail 20. The gap 64 may be configured such that a stopper 46 does not make contact with the upper rail 20 (e.g., the assembly may be configured such that a stopper 46 does not contact upper rail 20 as the upper rail moves relative to the lower rail 30). In embodiments, a stopper 46 may have a height H (e.g. a vertical height) that is configured and/or selected such that a stopper 46 may make contact with at least a portion of a roller cage 40, for example, as generally illustrated in FIG. 2B. For example, and without limitation, the height H of a stopper 46 may be about ⅔ or about 66% of a distance between the bottom portion 62 of the lower rail 30 and the upper edge 66 of a roller cage 40. It should be understood that the principles of the present disclosure contemplate other suitable dimensions of the one or more stoppers 46. It should also be understood that while FIGS. 2A and 2B generally illustrate one of the first end 50 or second end 60 of a lower rail 30, the principles described herein may apply to the other of the first end 50 or the second end 60 of a lower rail 30, or both ends 50, 60 of a lower rail 30.

In embodiments, one or more stoppers 46 may be disposed at an angle relative to the bottom portion 62 of the lower rail 30. In embodiments, one or more stoppers 46 may be disposed at an oblique angle relative to the bottom portion 62 and may extend in a direction generally away from an end of the lower rail 30 at which the one or more stoppers 46 may be disposed. For example, and without limitation, one or more stoppers 46 may be disposed at about a 25-35 degree angle and may extend generally away from the end at which one or more stoppers may be disposed (e.g., toward the opposite end). In embodiments, one or more stoppers 46 may be disposed at about a 30 degree angle or less relative to the longitudinal direction.

In embodiments, one or more stoppers 46 may be disposed at an oblique angle relative to the bottom portion 62 and may extend in a direction generally toward an end of the lower rail 30 at which the one or more stoppers 46 may be disposed. For example, and without limitation, one or more stoppers 46 may be disposed at about a 25-35 degree angle and may extend generally toward the end at which the one or more stoppers may be disposed. In embodiments, one or more stoppers 46 may be at about a 90 degree angle relative to the bottom portion 62 and may extend upward toward the upper rail 20.

Figure 3A:
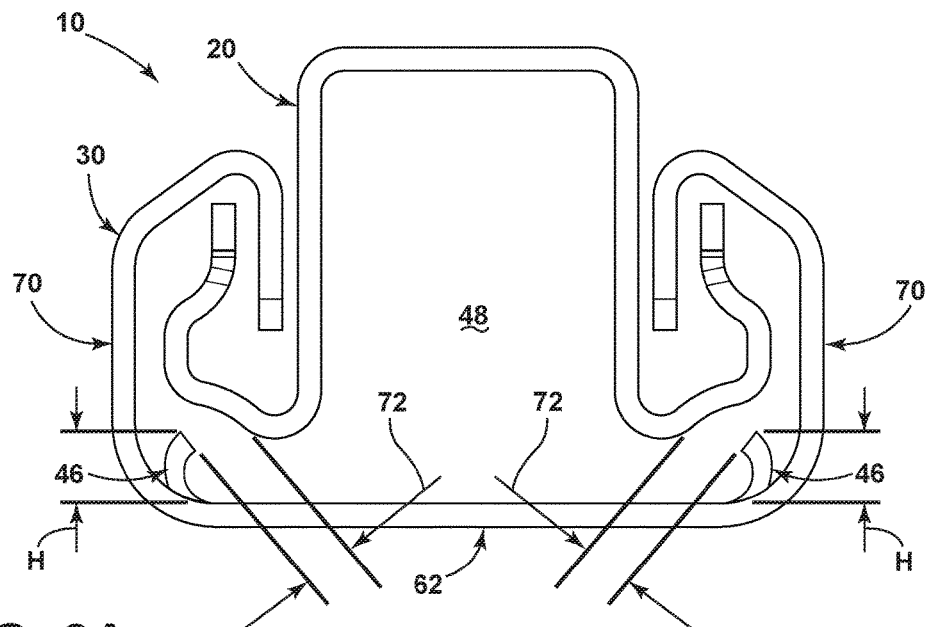
FIG. 3A generally illustrates a front view of a seat track assembly, including a plurality of stoppers according to embodiments of the present disclosure.
Figure 3B:
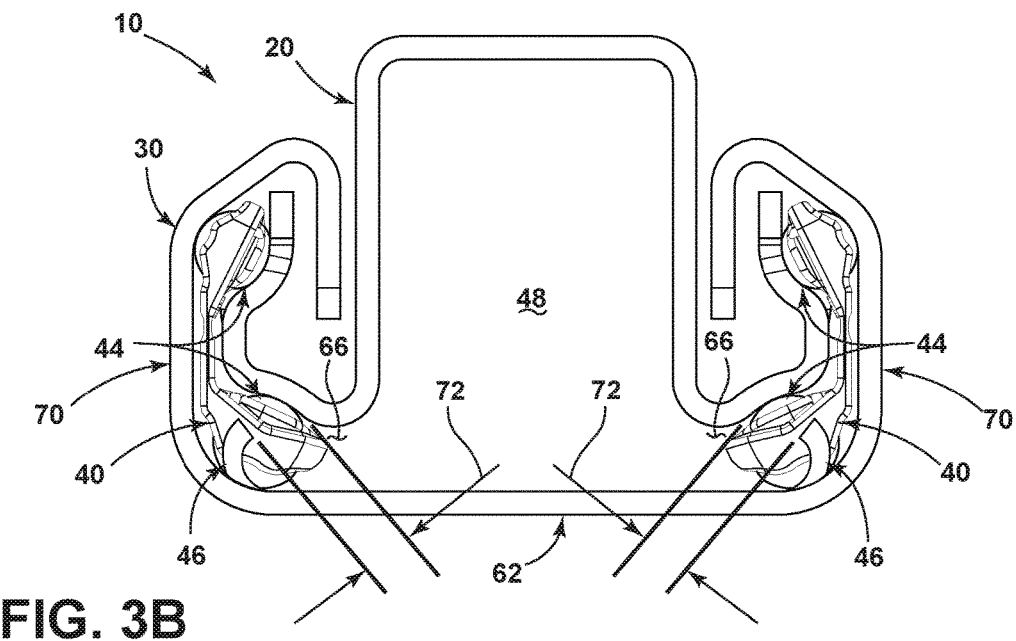
FIG. 3B generally illustrates a front view of the seat track assembly, as generally illustrated in FIG. 3A, including a roller cage according to embodiments of the present disclosure.
Figure 3C:
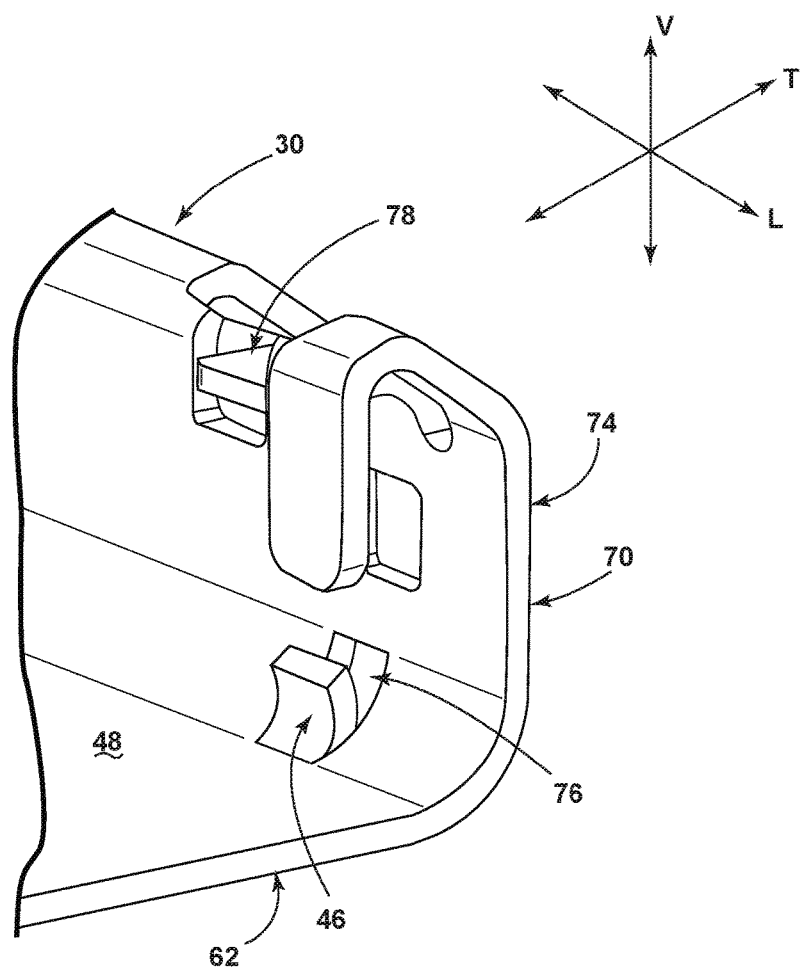
FIG. 3C generally illustrates a perspective view of a lower rail, including a stopper according to embodiments of the present disclosure.

With reference to FIG. 3A, a front view of a seat track assembly 10, including an upper rail 20 and a lower rail 30, is generally illustrated. In embodiments, the lower rail 30 may include one or more stoppers 46 disposed at one or more sides 70 of the lower rail 30. For example, and without limitation, the lower rail 30 may include an inner surface 48. One or more stoppers 46 may be disposed at the inner surface 48 on one or more sides 70. In embodiments, one or more stoppers 46 may comprise a generally planar shape (see, e.g., FIGS. 1, 2A, and 2B). In embodiments, one or more stoppers 46 may comprise a generally arcuate and/or hook shape and may project away from a side 70 (see, e.g., FIGS. 3A, 3B, and 3C). In embodiments, a gap 72 may be formed between one or more stoppers 46 and the upper rail 20. The gap 72 may be configured such that a stopper 46 does not make contact with any portion of the upper rail 20. In embodiments, a height H of a stopper 46 may be configured and/or selected such that a stopper 46 may make contact with at least a portion of a roller cage 40, such as is generally illustrated in FIG. 3B. For example, and without limitation, the height H of a stopper 46 may be about ⅔ or about 66% of a distance between the bottom portion 62 an upper edge 66 of a roller cage 40. It should be understood that the principles of the present disclosure contemplate other suitable heights or dimensions of one or more stoppers 46. It should also be understood that while FIGS. 3A and 3B generally illustrate one of the first end 50 or the second end 60 of a lower rail 30, the principles described herein apply to the other of the first end 50 or the second end 60 of a lower rail 30, or both ends 50, 60.

With reference to FIGS. 3A-3C, a portion of a lower rail 30 including a stopper 46 is generally illustrated. The stopper 46 may be curved, bent, punched, stamped, and/or otherwise formed from a portion of the lower rail 30. For example, and without limitation, during manufacturing and/or following manufacturing of the lower rail 30, a force (e.g., a bending or forming force) may be applied to a portion of the lower rail 30 in order to form a stopper 46 from a portion of the lower rail 30. In embodiments, a transverse force may be applied in the T direction to a portion of a side 70 of the lower rail 30. For example, and without limitation, the transverse force may be applied in the T direction to an outer portion 74 of the lower rail 30 inward toward the inner surface 48. The transverse force may cause a portion of the lower rail 30 to extend inwardly. In embodiments, the transverse force may cause a portion of the lower rail 30 to curve and/or bend inwardly and may form a generally arcuate and/or hook shaped stopper. In embodiments, the transverse force may cause a portion of the lower rail 30 to extend inwardly and may form a stopper that is generally planar relative to the side 70. The generally planar stopper may extend away from the side 70, e.g., at any of the angles described with respect to FIGS. 2A and 2B. In embodiments, an aperture 76 corresponding to the stopper 46 may be formed in the portion of the lower rail 30 in response to a transverse force being applied to lower rail 30.

With reference to FIGS. 1, 2A, and 2B, a stopper 46 may be formed from the bottom portion 62 of the lower rail 30. For example, and without limitation, a force may be applied in a substantially vertical direction V (e.g., upward) to a portion of the lower rail 30. For example, and without limitation, a force may be applied in a substantially vertical direction V to the outer portion 74 at or near a bottom portion 62 of the lower rail 30. The force may cause a portion of the lower rail 30 to extend upwardly toward the upper rail 20. In embodiments, the force may cause a portion of the lower rail 30 to curve and/or bend upwardly toward the upper rail 20 and may form a generally arcuate and/or hook shaped stopper. In embodiments, the force may cause a portion of the lower rail 30 to extend upwardly from the bottom portion 62 and/or the inner surface 48, which may form a stopper 46 that may include an angled, planar configuration. The stopper 46 may extend at an angle relative to the bottom portion 62, e.g., as at any of the angles of the stoppers 46 described in connection with FIGS. 2A and 2B. In embodiments, the stopper 46 may extend at an angle relative to a longitudinal direction L, e.g., at any of the angles of the stoppers 46 described in connection with FIGS. 2A and 2B. It should be understood that while only a generally arcuate and/or hook-shaped stopper 46 is generally illustrated in FIG. 3C, the principles described herein are not limited to a generally rectangular shaped and/or planar stopper, such as is illustrated in at least FIGS. 2A and 2B, and/or may apply to other suitably shaped stoppers. Further, while only a stopper 46 is illustrated generally extending from a side 70 of a lower rail 30, the principles described herein may apply to a stopper generally extending from a bottom portion 62 of a lower rail 30, and/or other suitable stopper locations and/or positions.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the scope thereof. Therefore, it is intended that the present teachings not be limited to the particular examples illustrated by the drawings and described in the specification, but that the scope of the present disclosure will include any embodiments falling within the foregoing description and the appended drawings.

What is claimed is:

1. A seat track assembly comprising:
   a first rail configured to move along a second rail;
   a roller cage disposed at least partially between the first and second rail; and
   a stopper projecting from an inner surface of the second rail and configured to restrict movement of the roller cage, wherein movement of the first rail relative to the second rail is independent of the stopper;
   wherein the stopper is offset from a longitudinal end of the second rail and the stopper extends at an oblique angle relative to a longitudinal direction of the second rail.

2. The seat track assembly of claim 1, wherein the stopper is integrally formed with the second rail.

3. The seat track assembly of claim 1, wherein the stopper comprises a reconfigured portion of the inner surface of the second rail.

4. The seat track assembly of claim 3, wherein the reconfigured portion of the inner surface of the second rail is bent upwardly toward the first rail.

5. The seat track assembly of claim 3, wherein the inner surface of the second rail includes an aperture corresponding to the reconfigured portion of the inner surface of the second rail.

6. The seat track assembly of claim 1, wherein the stopper includes an arcuate shape.

7. The seat track assembly of claim 1, wherein the stopper includes a substantially rectangular and planar shape.

8. The seat track assembly of claim 1, wherein the stopper extends away from the longitudinal end of the second rail.

9. The seat track assembly of claim 1, wherein the oblique angle is about 30 degrees or less.

10. The seat track assembly of claim 1, wherein the stopper is configured to engage or make contact with at least a portion of the roller cage.

11. The seat track assembly of claim 1, comprising a plurality of rollers at least partially retained by the roller cage.

12. The seat track assembly of claim 11, wherein the stopper is configured to engage the roller cage without contacting the plurality of rollers.

13. The seat track assembly of claim 1, comprising a plurality of stoppers projecting from the inner surface of the second rail; wherein the plurality of stoppers includes the stopper.

14. The seat track assembly of claim 1, comprising a second stopper disposed at a second end of the second rail.

15. The seat track assembly of claim 1, comprising a pair of stoppers disposed at the longitudinal end of the second rail; wherein the pair of stoppers includes the stopper.

16. The seat track assembly of claim 1, comprising a pair of stoppers disposed at the longitudinal end of the second rail and one or more stoppers disposed at a second end of the second rail; wherein the pair of stoppers includes the stopper.

17. The seat track assembly of claim 1, comprising a first pair of stoppers disposed at the longitudinal end of the second rail and a second pair of stoppers disposed at a second end of the second rail; wherein the first pair of stoppers includes the stopper.

18. A method for manufacturing a seat track assembly comprising:
   providing a first rail and a second rail;

forming a stopper in at least one of the first rail or the second rail;
providing a roller cage; and
disposing the roller cage at least partially between the first rail and the second rail such that movement of the roller cage is restricted by the stopper, and the first rail is permitted to move relative to the second rail independent of the restricted movement of the roller cage
wherein the stopper is offset from a longitudinal end of the at least one of the first rail or the second rail; and the stopper extends at an oblique angle relative to a longitudinal direction of the second rail.

19. The method of claim 18, wherein forming the stopper includes applying a substantially vertical bending or formation force to at least a portion of the first rail or second rail.

* * * * *